United States Patent Office 3,273,317
Patented Sept. 20, 1966

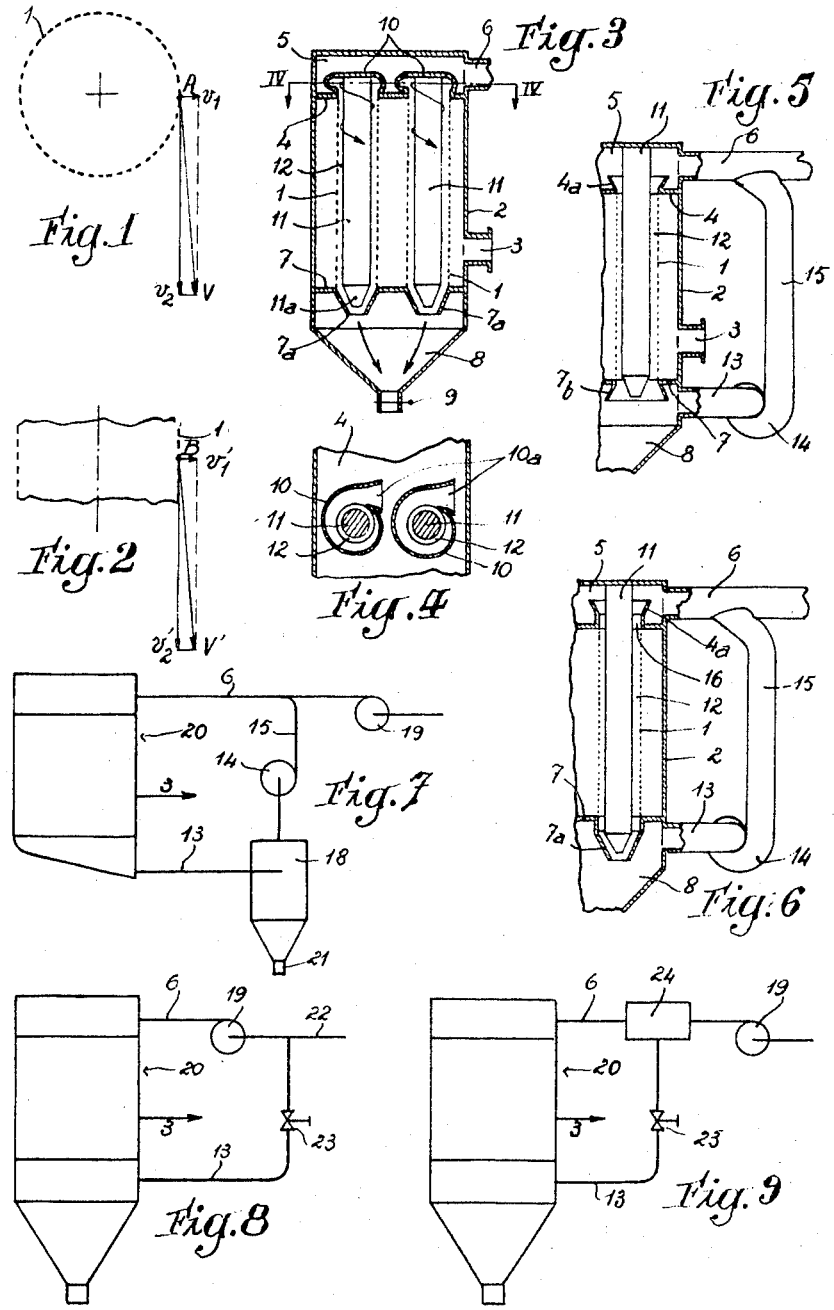

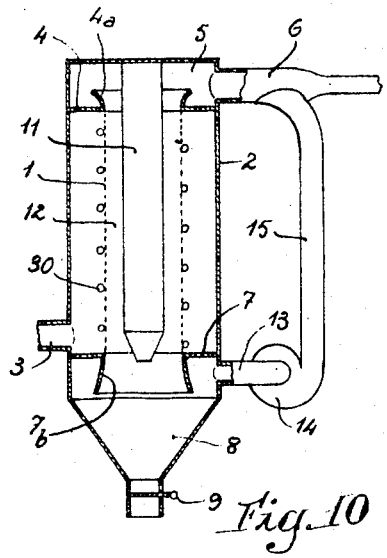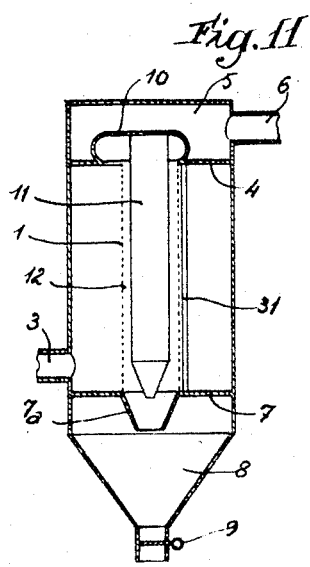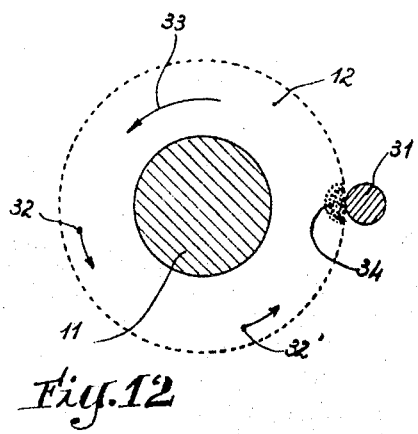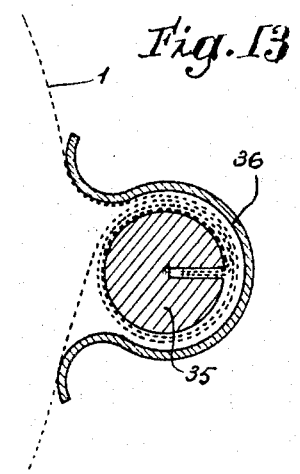

3,273,317
SLEEVE FILTERS
Pierre Georges Vicard, 15 Cours Eugenie, Lyon, France
Filed Oct. 6, 1961, Ser. No. 143,408
Claims priority, application France, Oct. 12, 1960,
40,828, Patent 1,276,842
2 Claims. (Cl. 55—103)

This invention refers to filters, and more particularly gas filters, of the kind in which the fluid to be filtered is caused to pass outwardly through filtering elements of sleeve form, generally made of canvas, which retain the particles in suspension in the fluid. The sleeves have to be cleaned at rather frequent intervals, which of course constitutes a serious problem.

The present invention has for its object to avoid or at least to reduce this disadvantage and to provide a sleeve filter which will be self-cleaning without requiring mechanical shaking devices, as this has been proposed in the prior art.

In accordance with this invention the filter comprises means to cause the fluid to be filtered to circulate at a high velocity within each filtering sleeve in close proximity of the filtering wall in a direction substantially parallel to the said wall. Owing to the high velocity the fluid flow is of the turbulent type and the more or less vibrating fluid stream therefore detaches and carries away the particles separated by the filtering wall which is thus continuously cleaned.

The fluid may be caused to circulate within each sleeve either circularly or longitudinally. In the first case the filter comprises means to impart to the fluid a whirling motion about the axis of each sleeve at the inlet thereof. In the second case the filter comprises means whereby the fluid is recycled from one end of the sleeves to the other end thereof. It is further possible to combine both arrangements in which case the fluid circulates helicoidally within the sleeves.

It is further of advantage to dispose within each sleeve a core which only leaves for the fluid an annular passage of relatively reduced width.

When the filtering sleeves are made of an electrically insulating material, as this is generally the case, the filtering operation may be enhanced by ionizing the particles in suspension in the fluid and by providing on the outer side of the wall of each sleeve grounded electrodes substantially transverse to the direction of the fluid flow and which retain by electrostatic action the particles which roll off the filtering wall of the sleeve under the action of the fluid stream, the said particles accumulating in the form of flakes which finally fall down into the lower dust collector of the filter.

If the sleeves are made of a highly insulating material, such as polyamides or like synthetic substances, non-ionized dust particles may become electrified by friction against the filtering wall itself and be retained by the grounded electrodes as above explained.

In the annexed drawings:

FIGS. 1 and 2 are two diagrams showing two possible forms of this invention.

FIG. 3 is a vertical section of a filter in which the fluid rotates within the filtering sleeves.

FIG. 4 is a longitudinal section thereof through line IV—IV of FIG. 3.

FIG. 5 is a fragmental section of a filter wherein the fluid is recycled through the sleeves.

FIG. 6 is a fragmental section of a filter in which the fluid rotates within the sleeves and is recycled through same.

FIGS. 7 to 9 illustrate various recycling arrangements.

FIG. 10 illustrates a sleeve filter having a spiral electrode disposed on the sleeves to retain dust particles by electrostatic action.

FIG. 11 shows another filter wherein the dust-retaining electrode is longitudinal.

FIG. 12 is an enlarged fragmental transverse section of FIG. 11.

FIG. 13 illustrates at a still larger scale a possible embodiment of a longitudinal electrode.

In FIG. 1 a cylindrical filtering sleeve 1 is shown in horizontal cross-section. Considering a point A on the inner side of the filtering wall and assuming the fluid to be filtered is a gas as this is generally the case, the dust-laden gas admitted into the sleeve passes through the said wall with a radial velocity component $v_1$ which for a satisfactory operation should be quite low, as for instance 0.02 m./s., which corresponds to a quiescent laminar flow. In accordance with the present invention the gas is additionally imparted a quite high tangential velocity component $v_2$, as for instance 20 m./s., corresponding to a vibrating turbulent flow. These components $v_1$ and $v_2$ have a resultant V which represents the actual velocity of the gas at point A. Since $v_2$ is approximately one thousand times greater than $v_1$, it may be said that in practice V does not noticeably differ from $v_2$.

This high tangential velocity V corresponds to a turbulent whirling motion of the gas within the sleeve. The high velocity vibrating gas stream which sweeps the inner side of the sleeve detaches and carries away the dust particles retained by the filtering wall which is thus continuously cleaned. The detached particles are maintained against the filtering wall by centrifugal force and thus roll down progressively while striking and detaching the other particles which have not yet been carried away by the gas stream.

In FIG. 2 the sleeve is shown in vertical section. Here again the gas passes through the filtering wall at a point such as B with a very low radial velocity component $v'_1$. The additional high velocity component $v'_2$ parallel to the filtering wall is here longitudinal as shown, the resultant V' being practically $v'_2$ itself. The high velocity longitudinal gas stream also detaches and carries away dust particles.

FIGS. 3 and 4 show a practical embodiment of a filter according to FIG. 1. The apparatus comprises a casing 2 having a lateral gas outlet 3. The open-ended tubular filtering sleeves 1 are secured by their upper ends to a perforated transverse partition 4 which forms the lower side of an upper inlet chamber 5 having a gas inlet 6, while their lower ends are secured to a lower transverse partition 7 which forms the upper side of a collecting chamber 8 having a dust outlet closed by a valve or door 9. The upper transverse partition 4 carries above each sleeve 1 a volute 10 having a tangential inlet 10a (FIG. 4) opening in chamber 5 and a lateral outlet which corresponds to the upper end of the sleeve. The unperforated upper lateral side of each volute 10 carries a cylindrical core 11 (FIG. 3) which extends downwardly into the corresponding sleeve 1, thus leaving for the gas a relatively narrow annular passage 12. The lower partition 7 carries below each sleeve a downwardly directed convergent frusto-conical nozzle 7a and the corresponding core 11 has a complementary frusto-conical lower end 11a.

The dust-laden gas is supplied to the inlet chamber 5 through inlet 6. It flows through volutes 10 and is thus imparted a high velocity whirling motion in the annular space 12 around cores 11. The lower convergent frusto-conical nozzles 7a maintain the centrifugal gas pressure in the lower portion of the sleeves and prevent the formation of edides. As explained with reference to FIG. 1, the particles carried away by the whirling gas column fall progressively and are collected in chamber 8. The filtered gas issues through outlet 3.

The inner cores 11 could be dispensed with, but it is to be noted that they limit the radial thickness of the whirling gas column and therefore avoid power losses which are generally encountered in the central portion of such a gas column.

In the embodiment of FIG. 5 the volutes 10 of FIGS. 3 and 4 are suppressed and the upper transverse partition 4 carries above each sleeve 1 a convergent nozzle 4a. The inner cores 11 extend upwardly and are secured to the upper side of casing 2. The lower partition 7 carries divergent nozzles 7b. There is further provided a gas recycling conduit 13 which extends from the upper part of the collecting chamber 8 to the inlet of a blower 14 the outlet of which is connected by a conduit 15 to the inlet 6 of casing 2.

In operation a large volume of dust-laden gas is continuously recycled from chamber 8 into chamber 5 and is therefore caused to flow downwardly through the sleeves. Owing to the presence of cores 11 which reduce the cross-section of the gas passage, the longitudinal velocity component in each sleeve is quite high and the conditions of FIG. 2 are therefore fulfilled. The dust particles carried away by the gas stream are for the most part collected in chamber 8.

It is to be noted that in this case the filtering sleeves and the inner cores could have a cross section other than circular, if desired.

The embodiment of FIG. 6 may be considered as a combination of the diagrammatical representations of FIGS. 1 and 2. As in FIG. 5 the inner cores 11 are carried by the upper side of casing 2 and the upper partition 4 has the convergent nozzles 4a. Further the gas is recycled between chamber 8 and chamber 5 through conduit 13, blower 14 and conduit 15. But nozzles 4a are provided with inner helicoidal blades 16 which impart a whirling motion to the tubular gas column which flows through space 12. Also the lower partition 7 supports downwardly directed convergent nozzle 7a as in FIG. 3.

It will be appreciated that the gas which flows downwardly through sleeves 1 between chambers 5 and 8 is imparted a high velocity whirling motion by vanes 16, in such a manner that considering any point on the inner side of the filtering wall of a sleeve and neglecting the low velocity radial component $v_1$ or $v'_1$ of FIGS. 1 or 2, it will be appreciated that the gas moves along a helical path with a turbulent motion and therefore detaches and carries away the separated dust particles which roll on the filtering wall under the action of centrifugal force.

It is obvious that nozzles 4a and vanes 16 could be replaced by the volutes 10 of the embodiment of FIGS. 3 and 4, and vice-versa.

In the modification diagrammatically illustrated in FIG. 7 a cyclone separator 18 is interposed in the conduit 13 which opens in the lower part of the casing 20 of the filter. The particles separated within the sleeves and which are more or less agglomerated with each other in the form of flakes or the like are pneumatically conveyed towards separator 18 from which they may be extracted from time to time through a discharge valve 21. FIG. 7 shows the blower 19 which forces the dust-laden gas into the apparatus.

The embodiment of FIG. 8 differs from FIG. 6 in that the recycling blower 14 is dispensed with, conduit 13 being connected with the gas supply conduit 22 upstream with respect to the main blower 19. Reference 23 designates a valve whereby the recycled flow may be adjusted at will.

In the modification of FIG. 9 reference numeral 24 designates an injector through which the dust-laden gas is forced by blower 19. This injector, which may be of the Venturi type, creates a suction effect which acts on the recycling conduit 13.

It is obvious that in the filters having a recycling arrangement, the latter may operate continuously or discontinuously. For instance in FIGS. 5, 6 and 7 the recycling blower 14 may remain idle until the sleeves have to be cleaned and may then be only operated during the time required for the cleaning operation, it being noted that during this operation the filtering process may continue. Alternatively blower 14 may be normally operated at a reduced speed and from time to time at a higher speed if the filtering sleeves need be cleaned.

FIG. 10 shows a filter of the kind described with reference to FIG. 5 in which on the outer side of each filtering sleeve 1 there is disposed a helix 30 made of a wire the ends of which are secured to partitions 4 and 7 and are therefore electrically grounded. Assuming that the dust particles in suspension in the gas to be filtered are ionized, when they pass close to the wire under the action of the high speed longitudinal gas stream which results from the recycling arrangement from chamber 8 to chamber 5, they are attracted and retained, at least in part. They thus accumulate locally on the inner side of the filtering wall in the form of flakes of progressively increasing dimensions, which are suddenly detached by the gas stream and carried into chamber 8.

In the embodiment of FIG. 11 the filter is generally of the type described with reference to FIGS. 3 and 4, but there is provided against the outer side of each sleeve a longitudinal metallic rod 31 having its upper end secured to the upper transverse partition 4 and/or its lower end secured to partition 7. As in the case of FIG. 10 if the dust particles are ionized, they are retained by rod 31 and accumulate in the form of flakes which finally fall into the lower collecting chamber 8. FIG. 12 clearly shows the operation. Considering a particle such as 32, it rotates at a high angular speed under the action of the whirling gas stream indicated by arrow 33. Owing to centrifugal force the particle follows a circular path in close proximity of the filtering wall. Reference 32' indicates a subsequent position of the particle. When the latter passes in front of rod 31 it is retained (or at least has a chance to be retained) by electrostatic action and there is therefore progressively formed an accumulation or flake 34 of retained particles. When this mass reaches a substantial radial dimension, it is detached by the whirling gas stream and falls into the lower collecting chamber.

FIG. 13 shows a convenient construction of a sleeve and electrode unit. The sleeve 1 is realized by means of a piece of canvas which is folded on itself, its opposed edges being wound together on a slotted rod 35 and held thereon by a gutter-shaped resilient clamping member 36 made for instance of sheet metal and forced on rod 35. The upper or the lower end of the latter may comprise any appropriate arrangement for being secured to partition 4 or to partition 7.

It is obvious that electrodes could also be provided in a filter of the kind of FIG. 6. Since in this case the gas follows a helicoidal path, these electrodes would conveniently be longitudinal, as in FIG. 11, but it would also be possible to use a helix of wire, as in FIG. 10, provided this helix is of opposed pitch with respect to the helicoidal motion of the gas within the sleeve.

In the embodiment of FIGS. 10 to 13 it has been hitherto assumed that the dust particles were ionized. In fact in the dust-laden gases resulting from many industrial processes the particles are charged electrically to a sufficient degree for the purpose sought for. When such is not the case, the said particles may be ionized by any known method, as for instance by ionizing electrodes appropriately disposed in the gas conduits.

It is further to be remarked that when the sleeves are made of a highly insulating substance, such as polyamides (as for instance nylon), the particles become charged electrostatically by friction against the filtering wall. Considering again FIG. 12 it will be appreciated that owing to the vibrating character of the turbulent whirling motion of the gas, a particle such as 32 will repeatedly strike the filtering wall. This will develop an electric charge on the particle and therefore the said particle will be retained by electrode 31.

I claim:

1. A filter for a fluid containing particles in suspension comprising tubular filtering elements in the form of substantially cylindrical sleeves each having a first end, a second end and a filtering wall made of a highly insulating textile material capable of developing electrostatic charges by frictional effect, with said filtering wall having an inner side and an outer side; an inner substantially cylindrical core disposed in each one of said sleeves, substantially coaxially thereto, to limit the fluid passage through the sleeve to an annular space of reduced cross-section; fluid inlet means to supply the fluid to be filtered to the first ends of said sleeves; means at the inlet end of each of said sleeves to cause said fluid to rotate at a high angular velocity within said annular space; a collecting chamber communicating with the second ends of said sleeves; means to collect the fluid filtered through the filtering walls of said sleeves; and a longitudinal grounded wire-like electrode disposed closely adjacent to the outer side of the filtering wall of each sleeve, substantially longitudinally thereto, to retain by electrostatic action against the adjacent portion of the innerside of the filtering wall of each sleeve the particles which have been retained by said filtering wall, which have been entrained by said fluid to be filtered and which have been electrostatically charged by friction against said filtering wall.

2. A filter for a fluid containing particles in suspension comprising tubular filtering elements in the form of substantially cylindrical sleeves each having a first end, a second end and a filtering wall made of a highly insulating textile material capable of developing electrostatic charges by frictional effect, with said filtering wall having an inner side and an outer side; an inner substantially cylindrical core disposed in each one of said sleeves, substantially coaxially thereto, to limit the fluid passage through the sleeve to an annular space of reduced cross-section; fluid inlet means to supply the fluid to be filtered to the first ends of said sleeves; a collecting chamber communicating with the second ends of said sleeves; means to recycle a portion of the fluid to be filtered from said collecting chamber into said inlet means; means to collect the fluid filtered through the filtering walls of said sleeves; and a helical grounded wire-like electrode disposed closely adjacent to the outer side of the filtering wall of each sleeve, to retain by electrostatic action against the adjacent portion of the inner side of the filtering wall of each sleeve the particles which have been retained by said filtering wall, which have been entrained by said fluid to be filtered and which have been electrostatically charged by friction against said filtering wall.

References Cited by the Examiner

UNITED STATES PATENTS

| | | | |
|---|---|---|---|
| 1,325,124 | 12/1919 | Strong | 55—6 |
| 1,454,492 | 5/1923 | Stroud | 55—324 |
| 1,843,839 | 2/1932 | Ruder | 55—127 |
| 1,856,685 | 5/1932 | Anderson | 55—338 |
| 1,916,337 | 7/1933 | Schmidt | 55—346 X |
| 1,947,447 | 2/1934 | Brassert et al. | 55—131 X |
| 2,081,772 | 5/1937 | Saint-Jacques | 55—6 |
| 2,079,315 | 5/1937 | Dickerson | 55—293 |
| 2,201,301 | 5/1940 | Richardson | 55—347 |
| 2,331,693 | 10/1943 | Jacobs et al. | 55—527 |
| 2,506,273 | 5/1950 | Linderoth | 55—338 |
| 2,629,459 | 2/1953 | Hammond et al. | 55—527 |
| 2,758,671 | 8/1956 | Silverman et al. | 55—484 |
| 2,853,151 | 9/1958 | Guldemond | 55—127 |
| 2,868,320 | 1/1959 | Westlin | 55—341 X |
| 2,973,830 | 3/1961 | Gruner | 55—103 |
| 3,045,828 | 7/1962 | Hume | 210—512 |

FOREIGN PATENTS 737,457   9/1955   Great Britain.

ROBERT F. BURNETT, *Primary Examiner.*

HERBERT L. MARTIN, *Examiner.*

C. SUKALO, *Assistant Examiner.*